United States Patent
Kosaki

(10) Patent No.: US 8,842,181 B2
(45) Date of Patent: Sep. 23, 2014

(54) CAMERA CALIBRATION APPARATUS

(75) Inventor: Masanori Kosaki, Fukushima-ken (JP)

(73) Assignee: Toshiba Alpine Automotive Technology Corporation, Iwaki-shi (JP)

(*) Notice: Subject to any disclaimer, the term of this patent is extended or adjusted under 35 U.S.C. 154(b) by 288 days.

(21) Appl. No.: 13/012,285

(22) Filed: Jan. 24, 2011

(65) Prior Publication Data

US 2011/0216194 A1  Sep. 8, 2011

(30) Foreign Application Priority Data

Mar. 2, 2010  (JP) .................................. 2010-045474

(51) Int. Cl.
H04N 7/18 (2006.01)
B60R 1/00 (2006.01)

(52) U.S. Cl.
CPC .. *B60R 1/00* (2013.01); *H04N 7/181* (2013.01)
USPC ........................................................ 348/148

(58) Field of Classification Search
USPC ............................ 348/148, 113–118; 382/104
See application file for complete search history.

(56) References Cited

U.S. PATENT DOCUMENTS

| | | | |
|---|---|---|---|
| 4,348,652 A * | 9/1982 | Barnes et al. ................. | 340/904 |
| 7,773,772 B2 | 8/2010 | Oizumi | |
| 8,269,848 B2 | 9/2012 | Kakinami | |
| 2006/0291698 A1 * | 12/2006 | Oizumi ........................ | 382/104 |
| 2008/0031154 A1 * | 2/2008 | Kakinami ..................... | 382/154 |
| 2008/0140286 A1 * | 6/2008 | Jung .............................. | 701/41 |
| 2008/0170122 A1 * | 7/2008 | Hongo et al. ................. | 348/148 |
| 2008/0186384 A1 | 8/2008 | Ishii et al. | |
| 2009/0201370 A1 * | 8/2009 | Otsuka et al. ................ | 348/148 |
| 2010/0259615 A1 * | 10/2010 | Yamamoto .................... | 348/148 |
| 2011/0013021 A1 | 1/2011 | Hongo | |

FOREIGN PATENT DOCUMENTS

| | | |
|---|---|---|
| CN | 1884968 A | 12/2006 |
| CN | 101065969 A | 10/2007 |
| CN | 101236655 A | 8/2008 |
| JP | 2002-135765 | 5/2002 |
| JP | 2008-11174 | 1/2008 |
| JP | 2008-187566 | 8/2008 |
| WO | WO 2009/116328 A1 | 9/2009 |

OTHER PUBLICATIONS

Combined Office Action and Search Report issued Feb. 4, 2013 in Chinese Application No. 201110034487.1 (With English Translation).

* cited by examiner

*Primary Examiner* — Andy Rao
*Assistant Examiner* — Jared Walker
(74) *Attorney, Agent, or Firm* — Oblon, Spivak, McClelland, Maier & Neustadt, L.L.P.

(57) ABSTRACT

According to one embodiment, a camera calibration apparatus includes: a plurality of on-vehicle cameras; a feature point detection section that identifies an image of lines representing a parking frame from each of images by the plurality of cameras and detects two feature points; a viewpoint conversion section that generate an overhead view having a viewpoint from just above the vehicle based on the feature points and two directions crossing each other at each of the feature points; and an adjustment section that determines the boundary position between the vehicle and line image from the overhead view to determine the display frame of a vehicle image and changes the overhead view such that the size ratio and position of the display frame become previously specified values.

9 Claims, 15 Drawing Sheets

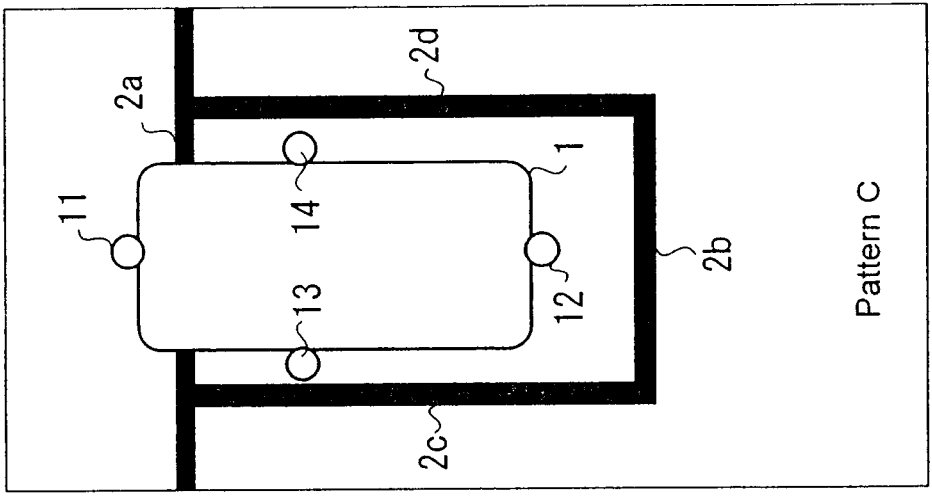
FIG. 4A — Pattern A
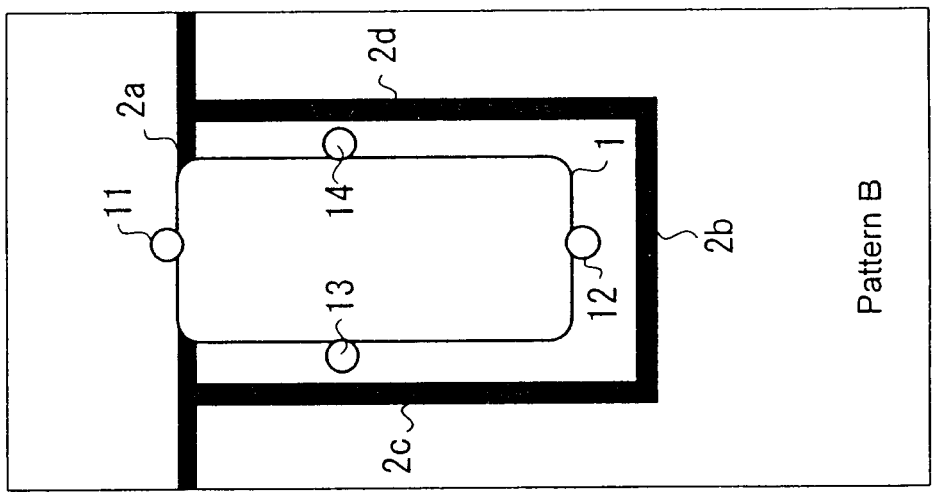
FIG. 4B — Pattern B
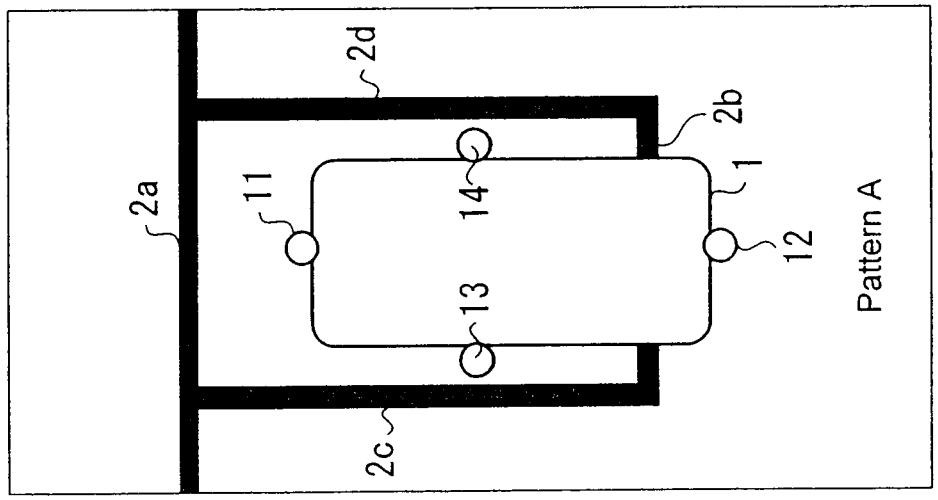
FIG. 4C — Pattern C Front camera Left camera Right camera Back camera Left camera Right camera Back camera Left camera Right camera Back camera | Pattern B |

Left camera | Pattern B |

Right camera | Pattern B |

Pattern B w : Lateral width of display region
h : Vertical width of display region
x : Lateral direction center position of target vehicle
y : Vertical direction center position of target vehicle
a : Vertical width of target vehicle (lateral width of target vehicle is automatically specified)

R
Overhead view display region

FIG. 15A
FIG. 15B
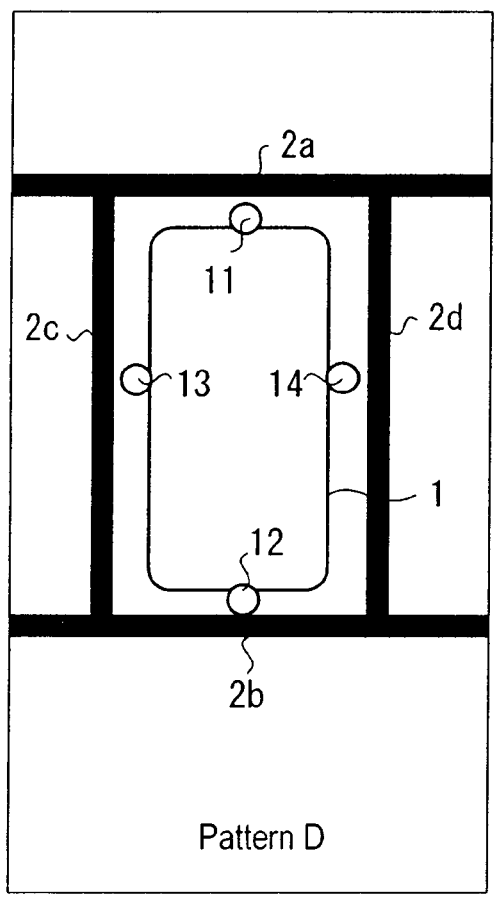
Pattern D
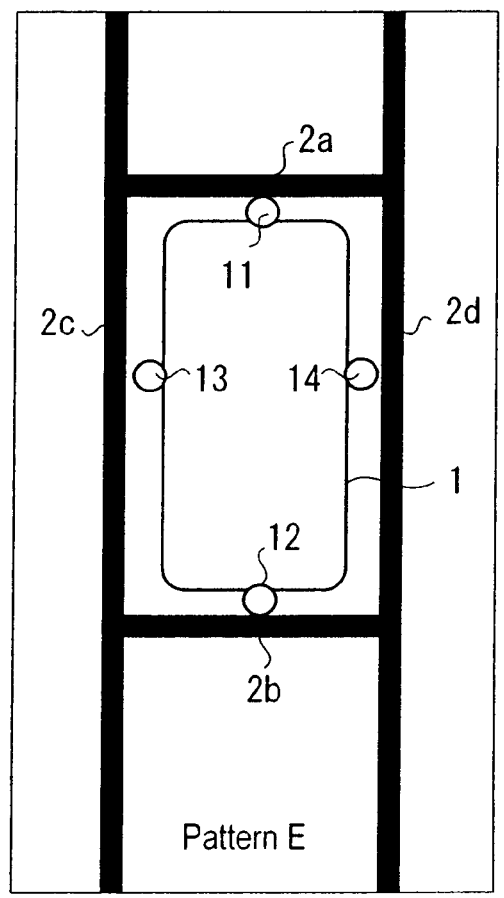
Pattern E

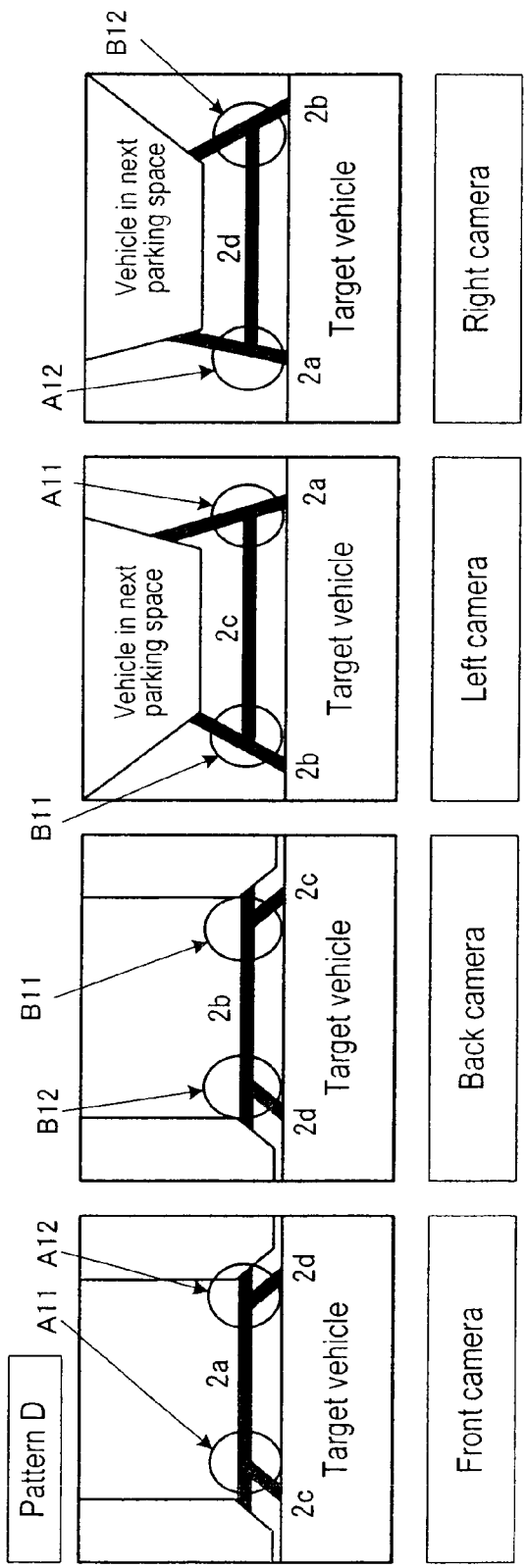

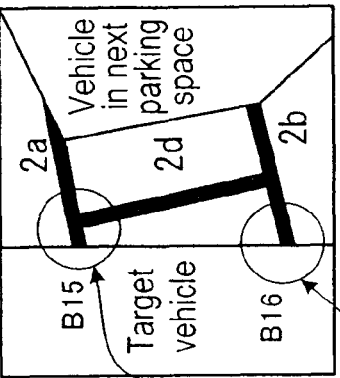
FIG. 17A Front camera Pattern D
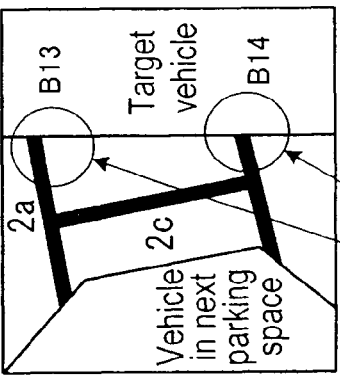
FIG. 17B Back camera Pattern D
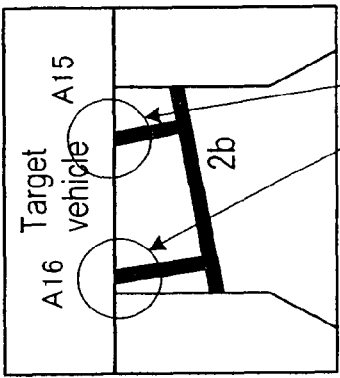
FIG. 17C Left camera Pattern D
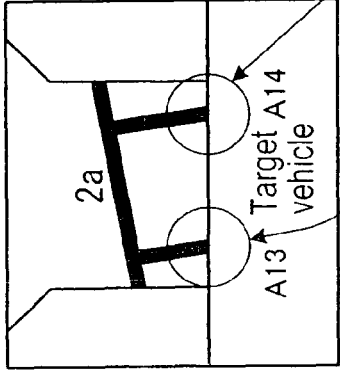
FIG. 17D Right camera Pattern D

CAMERA CALIBRATION APPARATUS

CROSS-REFERENCE TO RELATED APPLICATION

This application is based upon and claims the benefit of priority from the prior Japanese Patent Application No. 2010-045474, filed on Mar. 2, 2010, the entire contents of which are incorporated herein by reference.

BACKGROUND OF THE INVENTION

1. Field

Embodiments described herein relate generally to a camera calibration apparatus which is an on-vehicle camera apparatus having a plurality of on-vehicle cameras for taking images outside a vehicle so as to display them for a driver and performing camera calibration at camera installation time, etc.

2. Background

There is conventionally known an on-vehicle camera apparatus having the following configuration. In this on-vehicle camera apparatus, a plurality of cameras are mounted on a vehicle, and the cameras are used to acquire images of areas (front side, back side, left side, and right side) surrounding the vehicle. Then, images (overhead images) in which the viewpoints thereof are converted to those above the vehicle are created and then synthesized. The resultant image is further synthesized with the image (illustration, etc.) of the vehicle to obtain a top-view image. Displaying the overhead image facilitates grasping of a state of the vehicle and its surrounding environment, which, for example, supports driver's driving at the time when the vehicle is parked in a parking space. The overhead view is an image viewed from a virtual viewpoint set at, e.g., a position above the vehicle. By changing the position of the virtual viewpoint, appearance of the overhead view can be made different.

In conventional on-vehicle camera apparatus, the installation position, installation angle, and installation height of the camera are set to values that have previously been designed. However, an error occurs in the actual installation time, so that some misalignment may occur in the connection portions between a plurality of images photographed by a plurality of cameras at the time of image synthesis, with the result that the connecting portions in a synthetic image become discontinuous. In order to cope with this problem, there is proposed a calibration apparatus that sets a calibration pattern within a photographing area and calibrates the coordinates of a photographed image based on the photographed calibration pattern.

For example, a square-shaped calibration pattern having a side of about 1 m to 1.5 m is set in photographing area of each of four cameras, and the calibration patterns are used to position the images photographed by the respective cameras before image synthesis. In this method, it is necessary to set special calibration patterns for calibration on the ground surface, etc., and another calibration pattern for specifying the position of the vehicle at an accurate position.

Further, in the case of a calibration apparatus that detects the four corners (feature points) connecting white lines representing a parking space of a parking lot and uses the four feature points to calculate camera parameters (camera installation position, camera installation angle, focal distance, etc.), the number of feature points to be detected becomes large, so that it is necessary to perform the detection from a position to some extent away from the white lines and, in the case where the feature points are detected using front, back, left, and right cameras, the movement amount is increased due to a change of the vehicle's direction. Further, it is necessary to manually adjust the position of the vehicle or set feature points on the vehicle.

BRIEF DESCRIPTION OF THE DRAWINGS

FIGS. 4A to 4C are views illustrating three photographing patterns of a white line as a parking space;

FIGS. 15A and 15B are views each illustrating detection of feature points and angles in a modification of the present embodiment;

FIGS. 16A to 16D are views illustrating images photographed by the cameras in pattern D;

FIGS. 17A to 17D are views each illustrating the boundary which disappears in the shade of the target vehicle in pattern D;

DETAILED DESCRIPTION

According to one embodiment, a camera calibration apparatus includes: an image photographing unit that has a plurality of cameras mounted on a vehicle to obtain camera images for the surrounding area of the vehicle; a feature point detection unit that identifies an image of lines representing a parking frame from each of images obtained by the plurality of cameras and detects at least two feature points on the parking frame from each of the camera images; a viewpoint conversion unit that synthesizes the camera images based on information including the feature points detected by the feature point detection unit and two directions crossing each other at each of the feature points to generate an overhead view having a viewpoint from just above the vehicle; an adjustment unit that determines the boundary position between the vehicle and line image from the overhead view to determine the display frame of a vehicle image and changes the overhead view such that the size ratio and position of the display frame with respect to the overhead image become previously specified values; and a camera data storage that stores camera parameters representing characteristics of each of the cameras which are calculated based on the changed overhead view.

Hereinafter, one embodiment of the present invention will be described with reference to the accompanying drawings.

First Embodiment

Figure 1:
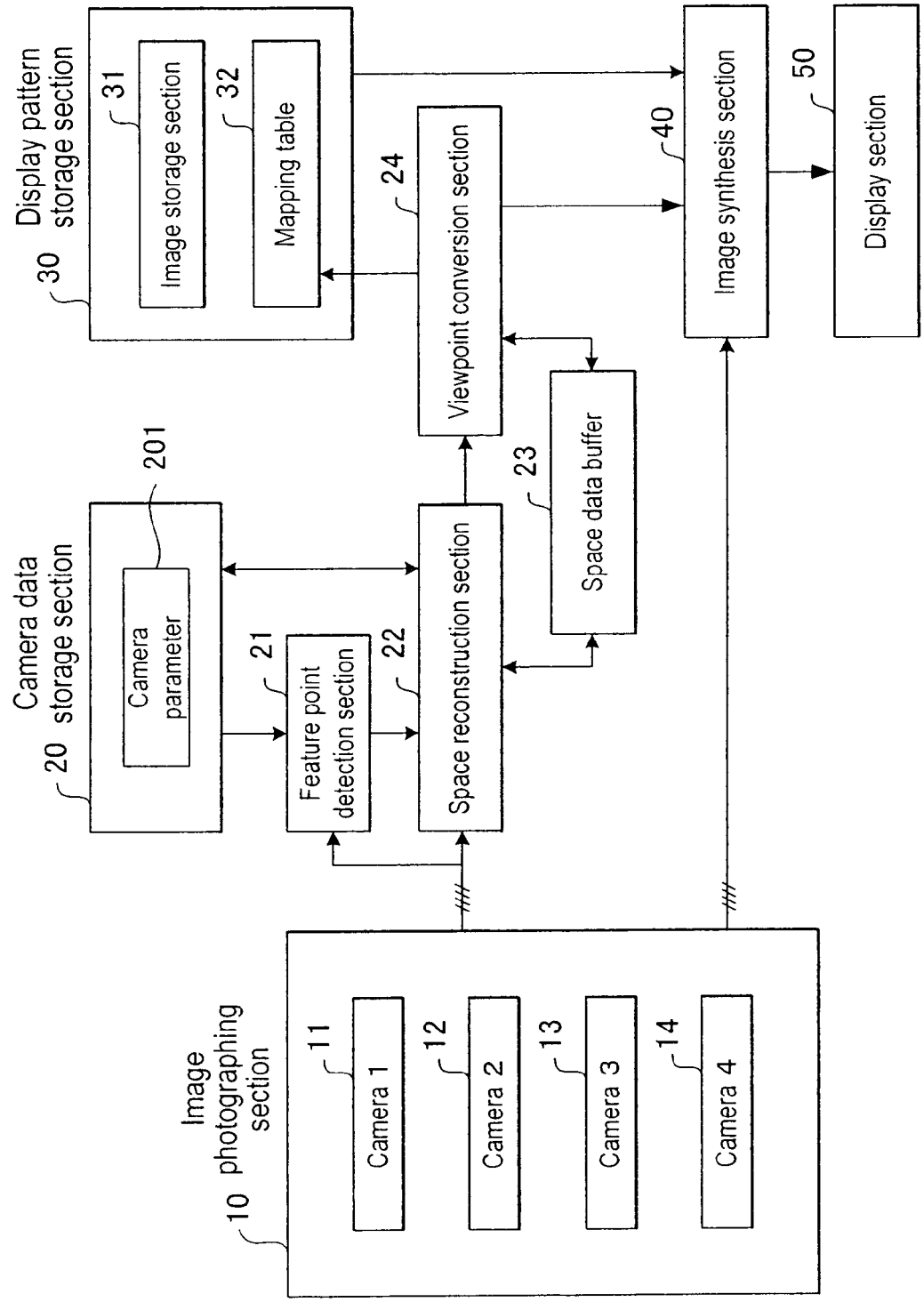
FIG. 1 is a block diagram illustrating a configuration of a camera calibration apparatus according to an embodiment of the present invention.

FIG. 1 is a block diagram illustrating a configuration of a camera calibration apparatus according to the present embodiment. The camera calibration apparatus includes an imaging section 10, a camera data storage section 20, a feature point detection section 21, a space reconstruction section 22, a space data buffer 23, a viewpoint conversion section 24, a display pattern storage section 30, an image synthesis section 40, and a display section 50.

The image photographing section 10 has, e.g., four cameras 11, 12, 13, and 14 for photographing images of area surrounding a vehicle. The four cameras 11, 12, 13, and 14 photograph the front surrounding area, back surrounding area, left surrounding area, and right surrounding area of the vehicle, respectively. A wide-angle camera such as a fisheye camera is suitably used as the cameras 11 to 14. The positions of the cameras 11 to 14 will be described later.

The camera data storage section 20 includes a camera parameter table 201 for storing camera parameters each representing characteristics of each of the cameras 11 to 14. The camera parameters can be obtained by extracting feature points from the image photographed by each of the cameras 11 to 14 and performing calculation based on the information of the feature points. The camera parameters represent camera characteristics such as camera installation position, camera installation angle, lens distortion correction value, and lens focal distance. When a correspondence between a plurality of feature points of the image photographed by each of the cameras 11 to 14 and positions of the feature points on a three-dimensional coordinate system is established, the camera parameters can be obtained approximately by calculation. A method for obtaining the camera parameters using calculation is disclosed also in Jpn. Pat. Appln. Laid-Open Publication No. 2002-135765.

The feature point detection section 21 detects, based on an input image from each of the cameras 11 to 14, the feature point on a road surface, such as a white line on the road surface representing a parking space surrounding the vehicle. The space reconstruction section 22 creates space data in which the image input from each camera is mapped onto a space model of a three-dimensional space based on the camera parameters. Further, the space reconstruction section 22 changes the space model as needed based on the feature points detected by the feature point detection section 21 and current position of the vehicle.

The space data buffer 23 temporarily stores the space data created by the space reconstruction section 22. The viewpoint conversion section 24 sets a given virtual viewpoint and creates an image viewed from the virtual viewpoint by referring to the space data from the space data buffer 23.

The display pattern storage section 30 includes an image storage section 31 and a mapping table 32. The image storage section 31 stores overhead images viewed from just above the vehicle, viewed from obliquely back side thereof, and the like. That is, the cameras 11 to 14 each photograph the surrounding area of the vehicle and generate a background image of the vehicle based on the photographed image; however, only an actual scene is displayed on the background image. Therefore, in order to synthesize the overhead image of the vehicle at a predetermined position of the background image, the images obtained by photographing the vehicle from just above, from obliquely back, and the like are previously stored in the image storage section 31 as the overhead images. Alternatively, an illustration image representing the vehicle is generated and stored as the overhead image. The number of the photographed images or illustration images is not limited to one, but a plurality of images are stored to be arbitrarily selected.

The mapping table 32 is a table that stores a correspondence between pixel data of the images photographed by the cameras 11 to 14 and pixel data of the background image in which the surrounding area of the vehicle is viewed from the virtual viewpoint. Specifically, the mapping table 32 stores conversion information representing to which pixel in the background image the pixel in the photographed image corresponds.

The image synthesis section 40 synthesizes a viewpoint-converted image (overhead view) created by the viewpoint conversion section 24 and a vehicle image (illustration, etc.) corresponding to the virtual viewpoint which is stored in the display pattern storage section 30 and displays the resultant image on the display section 50. Further, the image synthesis section 40 can arbitrarily select any of the camera images photographed by the image photographing section 10 for display on the display section 50.

Figure 2:
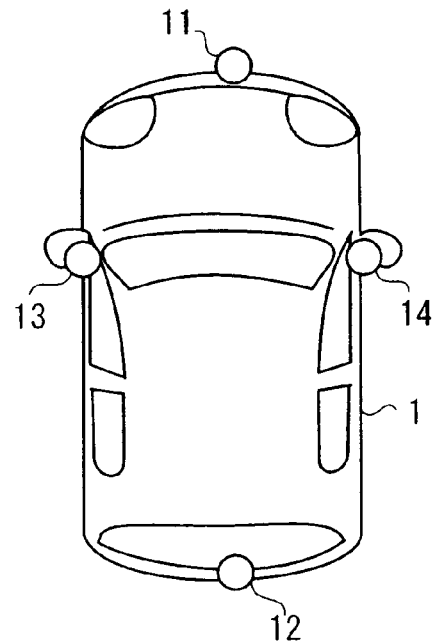
FIG. 2 is a plan view illustrating an example of camera arrangement.

An example of an arrangement of the cameras 11 to 14 will be described with reference to FIG. 2. In the present embodiment, four cameras 11 to 14 are installed. FIG. 2 is a top view of a vehicle 1. For example, the camera 11 is installed on the front side of the vehicle 1, camera 12 is installed on the back side thereof, camera 13 is installed near a left side mirror thereof, and camera 14 is installed near a right side mirror thereof.

In the manner as described above, the cameras 11 to 14 are installed on the four sides of the vehicle 1. Fish-eye cameras are suitably used as the cameras 11 to 14 in order to photograph the entire surrounding area of the vehicle 1. Hereinafter, the cameras 11 to 14 are referred to as a front camera, a back camera, a left camera, and a right camera, respectively. Further, the vehicle 1 provided with the camera is sometimes referred to as a target vehicle 1.

Hereinafter, operation of the main part (feature point detection section 21, space reconstruction section 22, viewpoint conversion section 24, camera data storage section 20, and space data buffer 23) of the camera calibration apparatus according to the present embodiment will be described. The lens distortion correction required for the camera calibration is disclosed also in Japanese Patent Application Laid-Open No. 2002-135765, in which, for example, a temperature sensor and a temperature correction table are provided so as to correct the lens distortion changing in accordance with the rise and fall of the ambient temperature. It is assumed here that four cameras be installed on the front side, back side, left side, and right side of the vehicle 1.

<Relative Position Adjustment>

First, the plurality of cameras (11 to 14) are installed on the front side, back side, left side, and right side of the vehicle as illustrated in FIG. 2. Then, after execution of the lens distortion correction, the viewpoint of the image is converted so as to make each of the cameras face downward (toward the ground surface) to some extent. At this time, the position of the viewpoint with respect to the image surface is stored.

Figure 3:
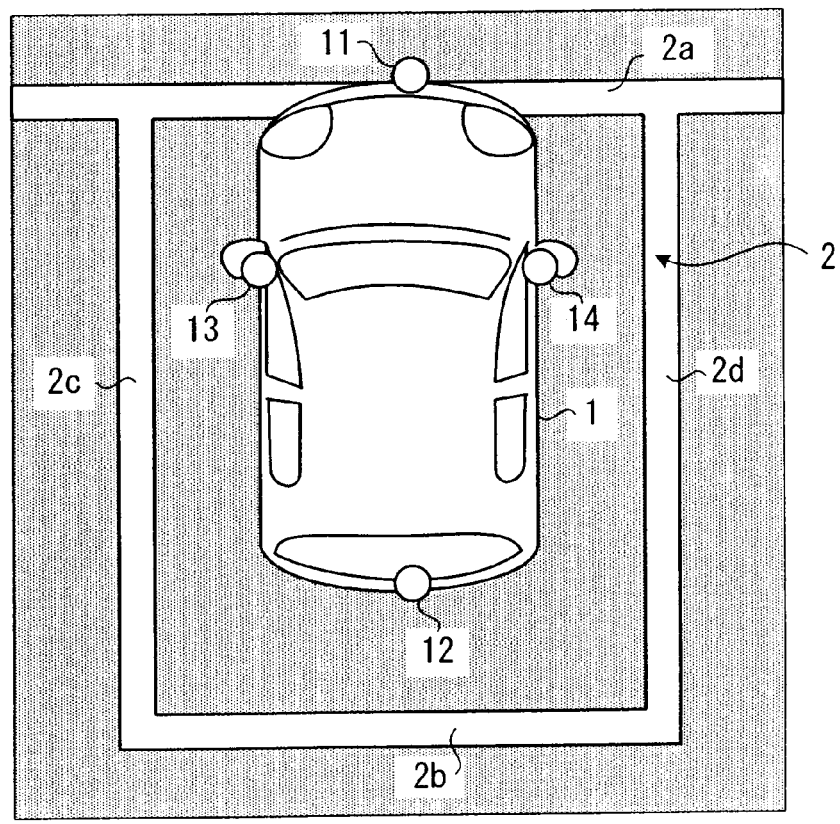
FIG. 3 is a plan view illustrating a state where a vehicle is parked within a parking space.

FIG. 3 is a plan view illustrating a state where the vehicle 1 is parked within a parking space. As illustrated in FIG. 3, a parking frame is assumed to be constituted by a square frame representing the parking space and a laterally extending line. Further, the number of image acquisition patterns is assumed to be three. In the parking lot, white lines representing a parking frame 2 are painted. The parking frame 2 includes a front white line 2a, a back white line 2b, a left white line 2c, and right white line 2d. The vehicle 1 is parked within the parking frame 2 of the parking lot with a certain level of accuracy, and the plurality of cameras (11 to 14) are used to photograph the white lines (2a to 2d) as the parking space, whereby white line images of three patterns (patterns A, B, and C) are acquired.

An image of the pattern A is an image obtained by moving the vehicle 1 to the position displaced toward the back relative to the parking frame 2 as illustrated in FIG. 4A and photographing the parking frame 2 using the front camera 11, left camera 13, and right camera 13 (14?). An image of the pattern C is an image obtained by photographing the parking frame 2 after moving the vehicle 1 to the position at which the front side of the vehicle 1 completely exceeds the white line 2a of the parking frame 2 as illustrated in FIG. 4C. An image of the pattern B is an image obtained by photographing the parking frame 2 after moving the vehicle 1 to the position between the positions in the patterns A and C as illustrated in FIG. 4B. Note that in FIGS. 4A to 4C and subsequent drawings, the white line constituting the parking frame 2 is depicted by a black line for the shake of convenience.

Then, the white lines (lines constituting the parking frame) painted on the ground surface are detected from the three pattern images for feature point detection. There are various methods for detecting the feature points (white lines). For example, the photographed image data is converted into monochrome image data for easy detection of the white lines, and the resultant image data is input to an image processor for edge extraction processing. That is, color image data is converted into gray-scale data (monochrome image), and a threshold value such as a brightness average value of the gray-scale data or median value, etc. of the brightness is set. When the gradient of the brightness between pixels is less than the set threshold value, no edge is detected, while when the gradient is not less than the threshold value, an edge is detected. Alternatively, a difference between the brightness of each pixel in the gray-scale image data and the pixel value of the pixel adjacent to the gray-scale pixel is detected, and the pixel having a large difference value is detected as an edge. With such methods, the coordinates of the edge are calculated, whereby the white lines painted on the ground surface are detected.

Figure 5A:
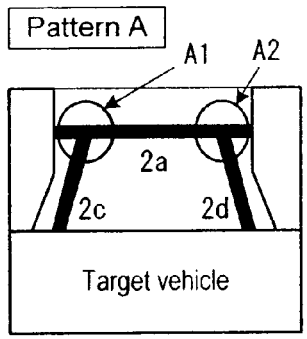
FIGS. 5A to 5C are explanation views illustrating images photographed by front, left, and right cameras in pattern A.
Figure 5B:
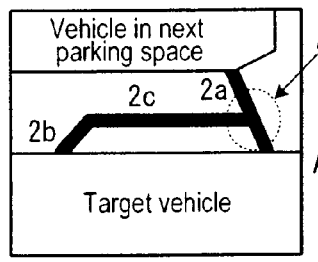
Figure 5C:
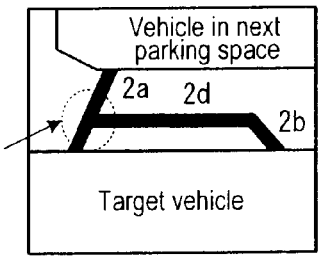
Figure 6A:
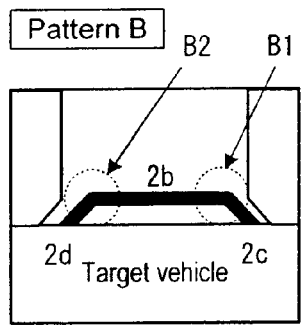
FIGS. 6A to 6C are views illustrating images photographed by back, left, and right cameras in pattern B.
Figure 6B:
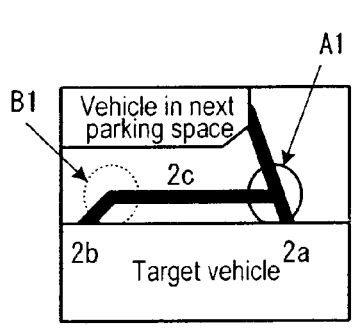
Figure 6C:
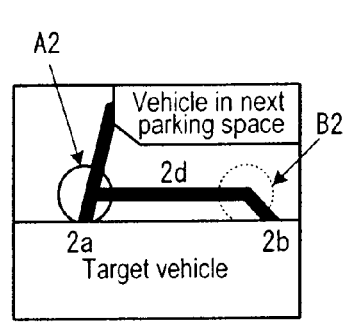
Figure 7A:
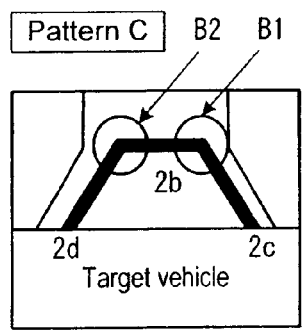
FIGS. 7A to 7C are views illustrating images photographed by back, left, and right cameras in pattern C.
Figure 7B:
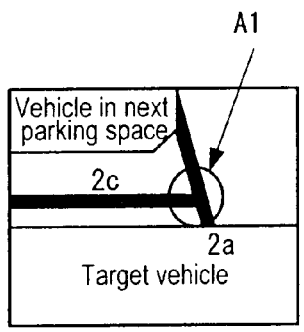
Figure 7C:
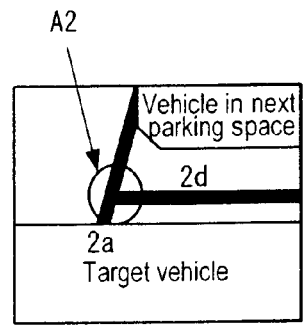

FIGS. 5A, 5B, and 5C illustrate images photographed by the front camera 11, left camera 13, and right camera 14, respectively in the pattern A. FIGS. 6A, 6B, and 6C illustrate images photographed by the back camera 12, left camera 13, and right camera 14, respectively in the pattern B. FIGS. 7A, 7B, and 7C illustrate images photographed by the back camera 12, left camera 13, and right camera 14, respectively in the pattern C. If another vehicle (vehicles) exists next to the vehicle 1, its image is also acquired; however, this poses no problem.

Based on the images of the pattern A of FIGS. 5A to 5C, the feature points are detected as follows. Feature points A1 and A2 photographed by the front camera 11 and two directions crossing each other at each of the feature points A1 and A2 are detected (FIG. 5A). That is, not only the feature points A1 and A2, but also two directions in which the white lines crossing each other at the feature points A1 and A2 extend are detected. Further, the feature point A1 photographed by the left camera 13 is detected (FIG. 5B), and feature point A2 photographed by the right camera 14 is detected (FIG. 5C). The feature point A1 corresponds to the intersection between the white lines 2a and 2c, and feature point A2 corresponds to the intersection between the white lines 2a and 2d.

Based on the images of the pattern B of FIGS. 6A to 6C, the feature points are detected as follows. Feature points B1 and B2 photographed by the back camera 12 are detected (FIG. 6A). Further, the feature points A1 and B1 photographed by the left camera 13 and two directions crossing each other at the feature point A1 are detected (FIG. 6B). Further, the feature points A2 and B2 photographed by the right camera 14 and two directions crossing each other at the feature point A2 are detected (FIG. 6C). The feature point B1 corresponds to the intersection between the white line 2b and white line 2c, and feature point B2 corresponds to the intersection between the white line 2b and white line 2d.

Based on the images of the pattern C of FIGS. 7A to 7C, the feature points are detected as follows. Feature points B1 and B2 photographed by the back camera 12 and two directions crossing each other at each of the feature points B1 and B2 are detected (FIG. 7A). Further, the feature point A1 photographed by the left camera 13 and two directions crossing each other at the feature point A1 are detected (FIG. 7B). Further, the feature point A2 photographed by the right camera 14 and two directions crossing each other at the feature point A2 are detected (FIG. 7C). The feature points are circled in FIGS. 5A to 5C, 6A to 6C, and 7A to 7C. The bold circle means detection of the feature point and two directions crossing each other at the feature point, and dotted circle means detection of only the feature point.

When the vehicle 1 is moved as illustrated in the patterns A, B, and C (FIG. 4), the positions of the cameras and relative positions of the feature points are changed. Thus, the feature points and two directions crossing each other at each of the feature points are preferably detected at a position where the two feature points are not too far away from each other, i.e., at a position where the two directions crossing each other at each of the feature points are easily recognizable. For example, in the case where the feature points B1 and B2 are detected in the pattern B (FIGS. 6A to 6C) and pattern C (FIGS. 7A to 7C), the two directions crossing each other at each of the feature points B1 and B2 can be recognized more easily in the pattern C, so that detection of the two directions crossing each other at each of the feature points B1 and B2 is not performed in the pattern B. In this example, the point at which the centers of the two white lines cross each other is detected as each feature point (A1, A2, B1, and B2). However, in order to increase the accuracy, it is preferable to detect not the center of the white line but the edge thereof for detection of the feature points and two directions crossing each other at each of the feature points.

Then, the viewpoint of the image photographed by each camera (11 to 14) is converted to the viewpoint just above the vehicle. In the case of the image photographed by the front camera 11, calculation is made such that the angle of each of the feature points A1 and A2 becomes a right angle based on the feature points A1 and A2 and two directions crossing each other at each of the feature points A1 and A2 in the pattern A.

Here, a three-dimensional space coordinate system is defined. For example, a three-dimensional space coordinate system is defined such that a line on the road surface extending in parallel to the back surface of the vehicle 1 is set as x-axis, a line on the road surface extending perpendicularly to the back surface of the vehicle 1 is set as y-axis, and an axis extending vertically from the road surface to the vehicle is set as z-axis. In this coordinate system, the direction of the camera is represented as follows. That is, assuming that the camera position is (0, 0, 0), the rotation angle of the camera with respect to x-axis is a, rotation angle thereof with respect to y-axis is β, and rotation angle thereof with respect to z-axis is γ. Hereinafter, the term "three-dimensional space coordinate system" or "three-dimensional space" used in this specification refers to the three-dimensional space coordinate system defined as above.

Figure 8A:
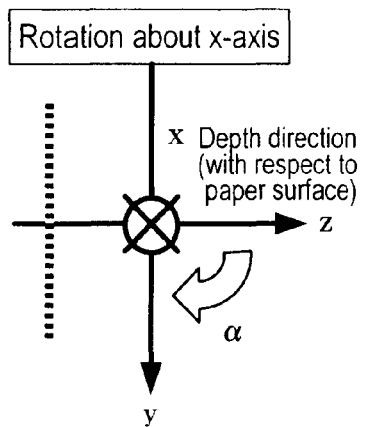
FIGS. 8A to 8C are views each illustrating the definition of a three-dimensional space coordinate system.
Figure 8B:
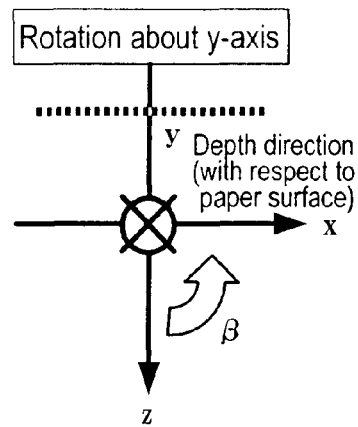
Figure 8C:
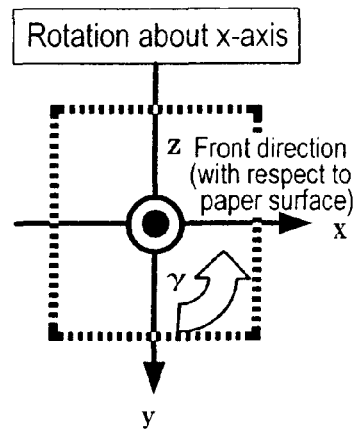

The coordinate system is defined as illustrated in FIGS. 8A to 8C, the rotation of each axis is calculated as follows.
Rotation about x-axis:

$x'=x$ $y'=y\cdot\cos(\alpha)+z\cdot\sin(\alpha)$ $z'=-y\cdot\sin(\alpha)+z\cdot\cos(\alpha)$ Rotation about y-axis:

$x'=x\cdot\cos(\beta)+z\cdot\sin(\beta)$ $y'=y$ $z'=-x\cdot\sin(\beta)+z\cdot\cos(\beta)$ Rotation about z-axis:

$x'=x\cdot\cos(\gamma)+y\cdot\sin(\gamma)$ $y'=-x\cdot\sin(\gamma)+y\cdot\cos(\gamma)$ $z'=z$ The viewpoint of each image is converted so as to make each of the cameras face downward (toward the ground surface) to some extent. Accordingly, the two directions crossing each other at the feature point to be detected are at a sort of right angle. The images are arranged as denoted by dotted lines of FIGS. 8A to 8C with the cameras facing in −z direction. The images are made perpendicular to z-axis.

Based on the images arranged as above, coordinates at which the feature point and two directions crossing each other at the feature point are detected are calculated. The lengths of the two directions are set to an adequate value, and two sets of coordinates are obtained for the two directions. That is, three sets of coordinates are defined, combined with the coordinates of the feature point. Then, x-axis rotation angle and y-axis rotation angle by which angle abc (b is the feature point) of the coordinates is made to be right angle as viewed in −z direction are calculated.

From the calculation formulas of the rotation about x-axis and rotation about y-axis, the coordinates after rotation are as follows.

$x'=x\cdot\cos(\beta)-y\cdot\sin(\alpha)\cdot\sin(\beta)+z\cdot\cos(\alpha)\cdot\sin(\beta)$ $y'=y\cdot\cos(\alpha)+z\cdot\sin(\alpha)$ $z'=-x\cdot\sin(\beta)-y\cdot\sin(\alpha)\cdot\cos(\beta)+z\cdot\cos(\alpha)\cdot\cos(\beta)$ In order for the coordinates to be seen as right angle when viewed in −z direction from the camera, it is necessary for lines ab and bc be defined by coordinates (X, Y) in which X=x/(−z) and Y=y/(−z) to cross each other at a right angle. Thus, the inclinations (a of y=ax+b representing a two-dimensional line) of the lines ab and bc with respect to +x direction are calculated as follows.

Line $ab:(Y(a)-Y(b))/(X(a)-X(b))$

Line $bc:(Y(c)-Y(b))/(X(c)-X(b))$

The right angle is achieved when a value obtained by multiplying the two inclinations is −1.

The calculation formula thereof is represented as f1(α,β)=0, and calculation formula drawn from another feature point is represented as f2(α,β)=0. Then, nonlinear simultaneous equations (Newton's method), etc., are used to provide solutions of α and β. The nonlinear simultaneous equation method (Newton's method) is a general method, and only a simplified explanation will be given.

The nonlinear simultaneous equations (Newton's method) for providing two solutions are as follows.
[Numeral 1]

$$\begin{pmatrix} \delta f1/\delta\alpha & \delta f1/\delta\beta \\ \delta f2/\delta\alpha & \delta f2/\delta\beta \end{pmatrix} \begin{pmatrix} \Delta\alpha \\ \Delta\beta \end{pmatrix} = \begin{pmatrix} -f1(\alpha,\beta) \\ -f2(\alpha,\beta) \end{pmatrix}$$

[ ]

"δf1/δα" is a result obtained by partially differentiating a function f1(α,β)=0 with respect to α. Further, Δα and Δβ are the solution to be provided, which are differences with respect to the initially set α and β respectively and include errors. Since the direction of the ground surface is set such that α and β each become a value close to zero, calculation is performed with 0 assigned to α and β initially. Then, obtained Δα and Δβ are added to the original α and β. Several calculations are then performed so that Δα and Δβ each converge to substantially zero.

Since the direction of the ground surface is set such that α and β each become a value close to zero, calculation is made to converge when the values of α and β have fallen in the range between −45° and +45° (limitation is set since the above method provides a plurality of convergent solutions). By this calculation method, the x-axis rotation angle and y-axis rotation angle are drawn.

Similarly, in the case of the image photographed by the back camera 12, calculation is made such that the angle of each of the feature points B1 and B2 becomes a right angle based on the feature points B1 and B2 and two directions crossing each other at each of the feature points B1 and B2 in the pattern C. In the case of the image photographed by the left camera 13, calculation is made such that the angle of the feature point A1 becomes a right angle based on the feature point A1 on the front side and two directions crossing each other at the feature point A1 in the pattern B and feature point A1 on the front side and two directions crossing each other at the feature point A1 in the pattern C. In the case of the image photographed by the right camera 14, calculation is made such that the angle of the feature point A2 becomes a right angle based on the feature point A2 on the front side and two directions crossing each other at the feature point A2 in the pattern B and feature point A2 on the front side and two directions crossing each other at the feature point A2 in the pattern C. Based on a calculation result obtained in the manner as described above, the view point of each image is converted to the viewpoint just above the vehicle.

Then, directions are uniquely determined with reference to the parking frame 2 in the pattern B. That is, just converting the viewpoint of the image to the viewpoint from above the ground only makes the angles of the feature points A1, A2, A3, and A4 be a right angle but cannot make the directions be uniquely determined. Thus, in order to uniquely determine the directions with reference to the parking frame 2, the image of the back camera 12 is adjusted (z-axis rotated) based on the feature points B1 and B2 in the pattern C such that the feature points B1 and B2 are positioned just lateral to each other. The back camera 12 is rotated by 180° with respect to the front camera 11, so that directions are adjusted such that the left side and right side become right side and left side, respectively.

Figure 9A:
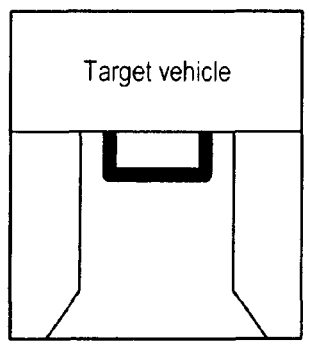
FIGS. 9A to 9C are views illustrating images of the back, left, and right cameras after adjustment.
Figure 9B:
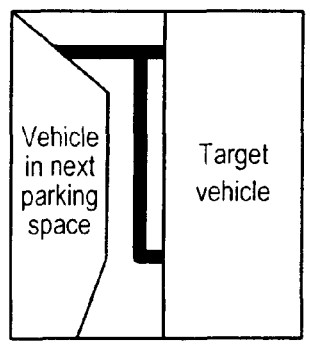
Figure 9C:
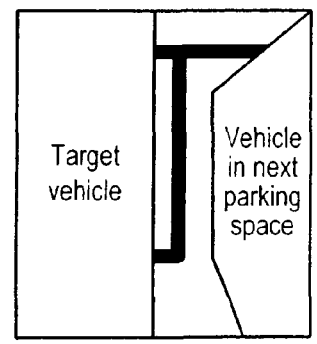

The image of the left camera 13 is adjusted based on the feature points A1 and B1 in the pattern B such that the front side and back side become upper side and lower side, respectively so as to position the feature points A1 and B1 just vertical to each other. The image of the right camera 13 is adjusted based on the feature points A2 and B2 in the pattern B such that the front side and back side become upper side and lower side, respectively so as to position the feature points A2 and B2 just vertical to each other. In the case of the image of the front camera 11, the feature point can not be acquired in the pattern B, so that adjustment of the directions is not performed. The images of the back camera 12, left camera 13, right camera 14 thus obtained in the above adjustment are as illustrated in FIGS. 9A, 9B, and 9C, respectively.

Then, the magnification factors of the left and right cameras 13 and 14 are determined so as to make the length between the two feature points A1 and B1 of the left camera image in the pattern B and length between the two feature points A2 and B2 of the right camera image in the pattern B equal to each other. Further, the magnification factor of the back camera is determined so as to make the two feature points B1 and B2 of the back camera 12 in the pattern B and back side feature points B1 and B2 of the left and right cameras 13 and 14 in the pattern B coincide with each other respectively and so as to make the two feature points B1 and B2 of the back camera 12 in the pattern C and back side feature points B1 and B2 of the left and right cameras 13 and 14 in the pattern C coincide with each other, respectively.

Alternatively, the aspect ratio of the white line frame 2 is input, and the magnification factor of the back camera 12 is determined so as to make the aspect ratio between the length between the two feature points B1 and B2 of the back camera 12 in the pattern B and length between the two feature points A1 and B1 of the left camera image in the pattern B or length between the two feature points A2 and B2 of the right camera image in the pattern B coincide with the input aspect ratio.

The relative height of the viewpoint is determined based on the magnification factors of the left and right camera 13 and 14 and back camera 12. According to the height of the viewpoint, the left, right, and back cameras are moved in parallel to the ground surface so as to make the two feature points B1 and B2 of the back camera 12 in the pattern B and back side feature points B1 and B2 of the left and right cameras 13 and 14 coincide with each other respectively to thereby determine the relative viewpoints of the left, right, and back cameras 13, 14, and 12.

Then, the rotation angle with respect to the ground surface, magnification factor, and relative viewpoint of the front camera 11 are determined so as to make the two feature points A1 and A2 in the pattern A and front side feature points A1 and A2 of the left and right cameras 13 and 14 in the pattern A coincide with each other, respectively. The image of the white line frame 2 thus determined is as illustrated in FIG. 10.

Figure 10:
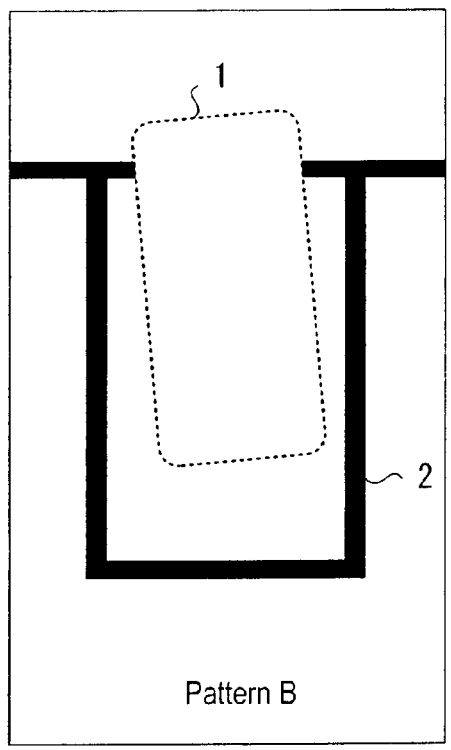
FIG. 10 is a view illustrating a displacement between the positions of a white line frame and vehicle.

However, in FIG. 10, although the four corners of the white line frame 2 representing the parking space have 90°, the center line of the vehicle 1 and that of the white line frame 2 are displaced from each other. The length of the line is set in accordance with the length of the white line frame 2 of the parking space, so that the size of the vehicle 1 may become too large or too small. Further, the position of the white line frame 2 is displaced from the position of the vehicle 1 toward the left or front side. The boundary between the vehicle 1 and white line frame 2 is not clear, so that the vehicle image is reflected on the image of the white line frame 2. Thus, subsequently, absolute position adjustment is performed.

<Absolute Position Adjustment>

Figure 11:
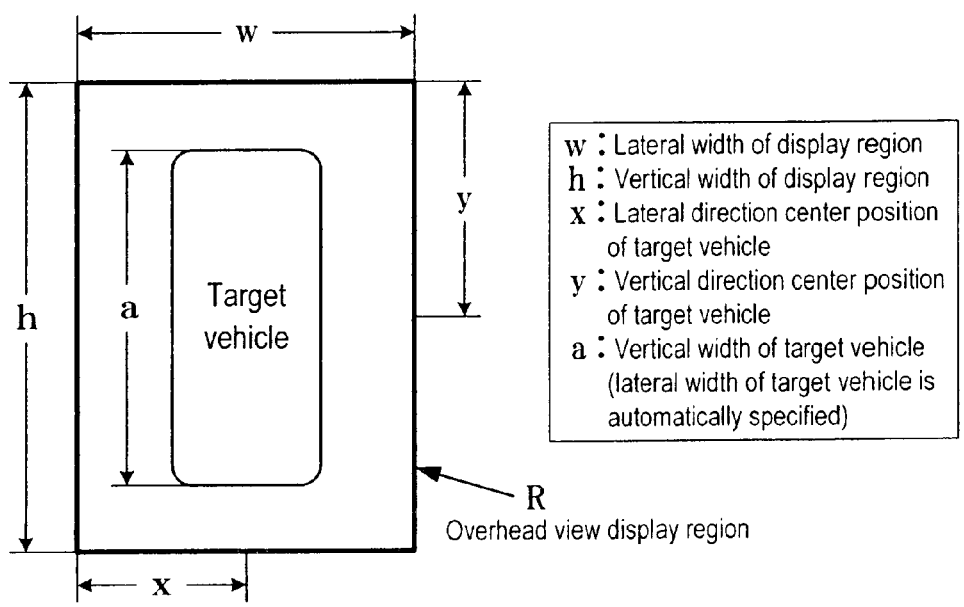
FIG. 11 is a view illustrating a display frame of the target vehicle in the display region of an overhead view.

In FIG. 10, the size, position, and direction of the target vehicle 1 are not specified. Thus, as illustrated in FIG. 11, adjustment is performed such that the display frame of the target vehicle falls within a predetermined range with respect to a display region R of the overhead image. In FIG. 11, the region R surrounded by a bold frame represents the display region of the overhead view and is defined by lateral width w and vertical width h. The display frame of the target vehicle is defined by vertical width a, lateral direction center position x, and vertical direction center position y.

Figure 12:
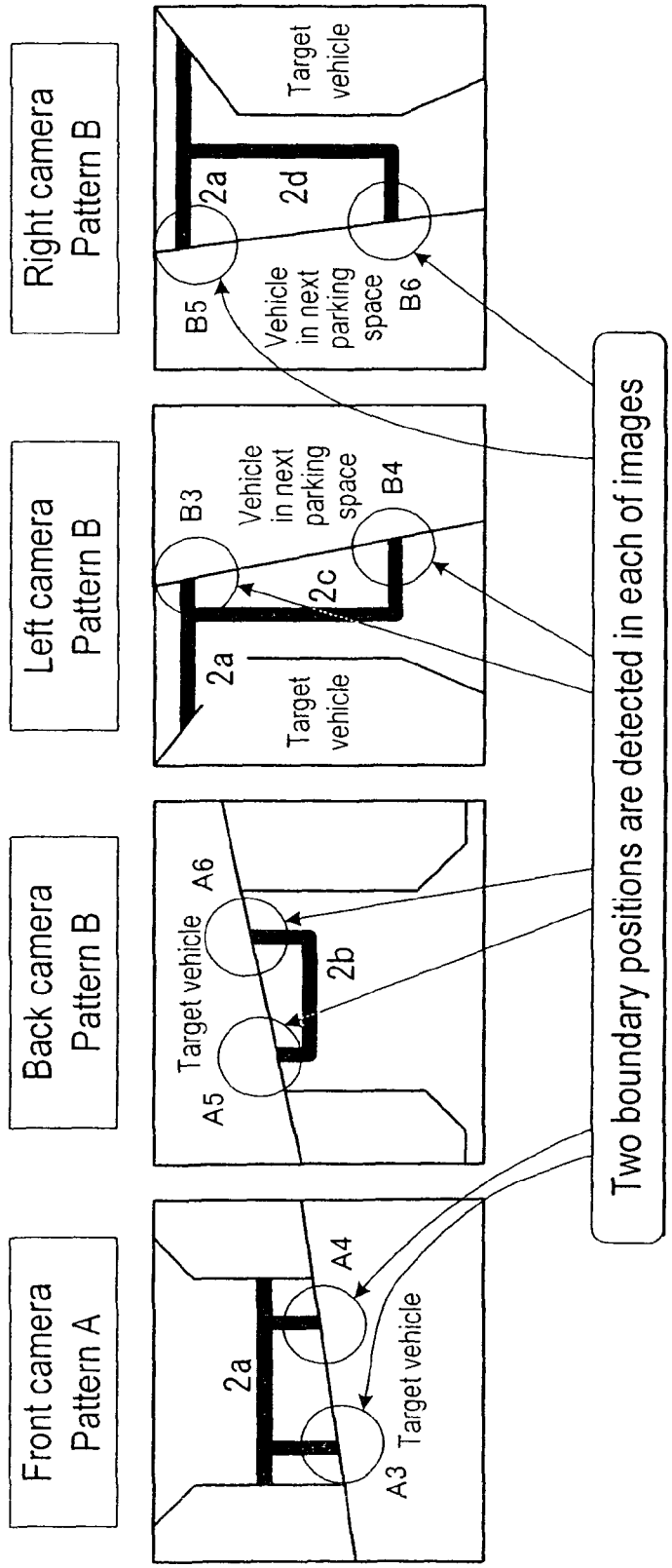
FIGS. 12A to 12D are views illustrating images of the cameras after adjustment in patterns A and B.

First, as illustrated in FIG. 12, the boundary between the vehicle 1 and ground surface is detected from the patterns A and B. In this example, a method of specifying a position (boundary position) at which the white line 2 disappears in the shade of the target vehicle 1 is employed as the detection method. The range within which the white line 2 of the parking space extends straight with the thickness thereof kept constant is the region of the white line, and the leading end of the white line region is the boundary with the target vehicle 1. FIG. 12A is an image after adjustment (angle of the feature point is made to be a right angle, feature points are made to be positioned just lateral to each other, and relative position with respect to other cameras is adjusted) of the front camera 11 in the pattern A, and FIG. 12B is an image after adjustment of the back camera 12 in the pattern B. FIG. 12C is an image after adjustment of the left camera 13 in the pattern B, and FIG. 12D is an image after adjustment of the right camera 14 in the pattern B. For error absorption, the images after adjustment in all the patterns A, B, and C may be acquired.

Two boundary positions are then detected from each of the images after adjustment, i.e., each of the images of FIGS. 12A to 12D. In FIG. 12A, the boundary positions are surrounded by circles A3 and A4, respectively. In FIG. 12B, the boundary positions are surrounded by circles A5 and A6, respectively. In FIG. 12C, the boundary positions are surrounded by circles B3 and B4. In FIG. 12D, the boundary positions are surrounded by circles B5 and B6.

Then, a boundary line is created based on detected two boundary points of each of the left and right cameras 13 and 14. The absolute angles are then calculated so as to make the boundary line extend nearly completely vertically in each of the left and right cameras 13 and 14 and, based on the calculated absolute angles, the directions and positions of the images after adjustment of the cameras 11, 12, 13, and 14 are adjusted. The above absolute angles may be calculated using the images of the front and back cameras 11 and 12. In this case, the absolute angles are calculated so as to make the boundary line extend nearly completely horizontally in each of the front and back cameras 11 and 12 and, based on the calculated absolute angles, the directions and positions of the images after adjustment of the cameras 11, 12, 13, and 14 are adjusted.

Figure 13:
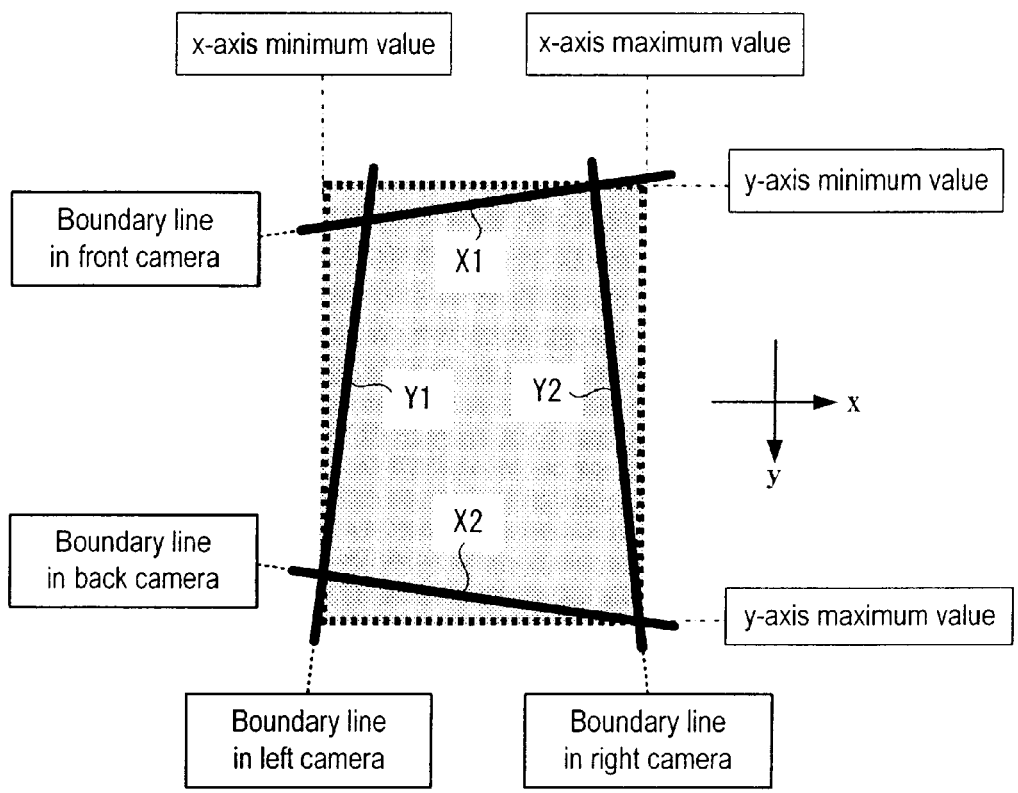
FIG. 13 is a view illustrating how to make image after adjustment appear to be rectangular.

Since there is a possibility that the boundary lines may slant in the above adjustment, a rectangle is created from the four boundary lines in the images of the cameras (11 to 14). For example, as illustrated in FIG. 13, intersections of the boundary lines are calculated with the boundary line in the front camera 11 being X1, boundary line in the back camera 11 (12?) X2, boundary line in the left camera 13 Y1, and boundary line in the right camera 14 Y2, and a rectangle (bold dotted line) defined by x-axis minimum and maximum values and y-axis minimum and maximum values of the intersections is created.

The created rectangle serves as a display frame for displaying an illustration, etc., of the target vehicle 1, and the size of the overhead image is changed such that the size ratio and position of the display frame with respect to the overhead image become previously specified values so as to allow the overhead view to fall within the previously set display region R (FIG. 11). The space reconstruction section 22 constitutes an adjustment section that changes the size of the overhead image.

The camera position and camera direction are thus determined, and such camera parameters are stored in the camera data storage section 20.

Figure 14:
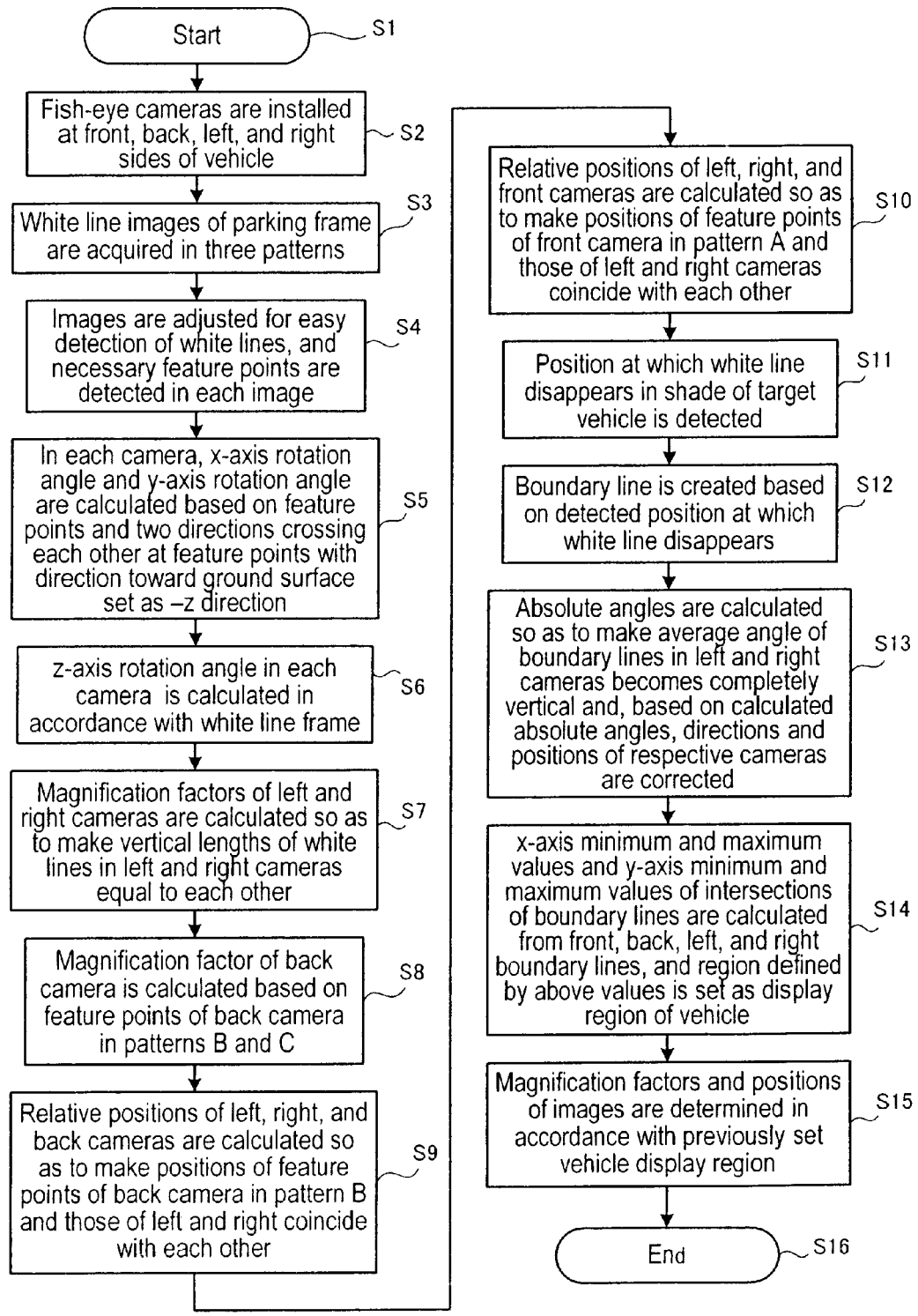
FIG. 14 is a flowchart illustrating operation of camera calibration.

FIG. 14 is a flowchart illustrating the above operation. In FIG. 14, step S1 is a start step of the camera calibration and, in step S2, the cameras (11 to 14) are installed at the front, back, left, and right side of the vehicle. In step S3, the white line images are acquired in the three patterns A, B, and C. In step S4, the acquired images are adjusted (converted into gray-scale data) for easy detection of the white lines, and necessary feature points are detected in each image. In step S5, in each camera, x-axis rotation angle and y-axis rotation angle are calculated based on the feature points and two directions crossing each other at each of the feature points with the direction toward the ground surface set as −z direction. In step S6, z-axis rotation angle in each camera is calculated in accordance with the white line frame.

Next, in step S7, the magnification factors of the left and right cameras 13 and 14 are calculated so as to make the vertical lengths of the white lines in the left and right cameras 13 and 14 equal to each other. In step S8, the magnification factor of the back camera 12 is calculated based on the feature points of the back camera 12 in the patterns B and C. In step S9, the relative positions of the left, right, and back cameras are calculated so as to make the positions of the feature points of the back camera 12 in the pattern B and those of the left and right cameras 13 and 14 coincide with each other. In step S10, the relative positions of the left, right, and front cameras are calculated so as to make the positions of the feature points of the front camera 11 in the pattern A and those of the left and right cameras 13 and 14 coincide with each other.

In step S11, the position at which the white line disappears in the shade of the target vehicle (or position at which the white line appears from the shade of the vehicle) is detected. In step S12, the boundary line is created based on the detected position at which the white line disappears in the shade of the target vehicle. In step S13, the absolute angles are calculated so as to make the average angle of the boundary lines in the left and right cameras 13 and 14 becomes completely vertical and, based on the calculated absolute angles, the directions and positions of the images photographed by the respective cameras are corrected. In step S14, the x-axis minimum and maximum values and y-axis minimum and maximum values of the intersections of the boundary lines are calculated from the front, back, left, and right boundary lines, and the region (display frame) defined by the above values is set as the display region of the vehicle. In step S15, the magnification factors and positions of the images are determined in accordance with a previously set vehicle display region, and this processing flow ends in step S16.

Thus, when the vehicle 1 is parked within the white line frame 2, the rectangular-shaped white line frame 2 and illustration image of the target vehicle 1 parked within the white line frame 2 are displayed within the display region R in the overhead image, and the images photographed by the cameras 11 to 14 are normally synthesized to thereby obtain a seamless synthesis image. Further, only two feature points are required to be detected in each of the cameras 11 to 14, simplifying the calibration.

Next, a modification of the present embodiment will be described. In the case where the installation positions of the cameras (11 to 14) have been identified in terms of distance, it is only necessary to determine the installation directions of the cameras. In this case, it is not necessary to move the vehicle 1 in order to detect the two feature points and two directions crossing each other at each of the feature points for each of the cameras 11 to 14.

That is, it is not necessary to move the vehicle if the front and back cameras 11 and 12 capture the white lines 2a and 2b pass laterally thereacross, respectively, and left and right cameras 13 and 14 each capture the two feature points and two directions crossing each other at each of the feature points, as illustrated in a pattern D of FIG. 15A. Alternatively, it is not necessary to move the vehicle if the left and right cameras 13 and 14 capture the vertical white lines 2c and 2d, respectively and front and back cameras 11 and 12 each capture the two feature points and two directions crossing each other at each of the feature points, as illustrated in a pattern E of FIG. 15B.

The pattern D will be described with reference to FIGS. 16A to 16D. FIGS. 16A to 16D illustrate images photographed by the cameras 11 to 14 in the pattern D. From the image of the pattern D, feature points A12 and A12 photographed by the front camera 11, feature points B11 and B12 photographed by the back camera 12 are detected. In addition, the feature points A11 and B11 photographed by the left camera 13 and two direction crossing each other at the feature points A11 and B11, and feature points A12 and B12 photographed by the right camera 14 and two directions crossing each other at each of the feature points A12 and B12 are detected.

Then, the left and right cameras 13 and 14 are rotated according to the above calculation formula such that the two directions crossing each other at each of the feature points in each camera image are at right angle. Further, the left and right cameras 13 and 14 are rotated in the perpendicular direction with respect to the ground surface such that the white line in each of the left and right cameras 13 and 14 extends completely vertically. From the height position of the left and right cameras 13 and 14, the length of the completely vertical white line can be detected. Based on the positional relationship between the feature point at the end of the white line and left and right cameras 13 and 14, the interval between the feature points of the lateral line seen in each of the front and back cameras 11 and 12 is calculated. Then, based on the positions of the feature point at the end of the lateral line seen in each of the front and back cameras 11 and 12 and front and back cameras 11 and 12, the directions of the front and back cameras 11 and 12 are specified. The calculation formula is as follows.

The front left feature point of the target vehicle 1 is used for explanation. It is assumed that the position of the left side feature point in the front camera 11 before rotation is represented by (x, y, z) and the calculated position of the feature point in the left camera 13 corresponding to the installation position of the front camera 11 is represented by (xa, ya, za). Assuming that the coordinates obtained by x-axis rotating, y-axis rotating, and z-axis rotating the feature point (x, y, z) are represented by (xb, yb, zb), elements xb, yb, and zb are functions of α, β, and γ.

The coordinates (xa, ya, za) and coordinates (xb, yb, zb) are each coordinates corresponding to the front camera 11, so that calculation formula for making the positions of the apexes coincide with each other when viewed from the camera in the −z direction is as follows.

$$xa/(-za)=xb/(-zb)$$

$$ya/(-za)=yb/(-zb)$$

Then, from the above two formulas, formulas of $f1(\alpha,\beta,\gamma)=0$ and $f2(\alpha,\beta,\gamma)=0$ are created. In order to draw α, β, and γ using the nonlinear simultaneous equation method (Newton's method), one more formula is required. Thus, the front right feature point of the target vehicle 1 is used to prepare another formula. Thus prepared three formulas are used to solve the nonlinear simultaneous equations to thereby obtain α, β, and γ.

Since the direction of the ground surface is set such that α and β each become a value close to zero, and the front camera 11 has been hardly rotated about z-axis, calculation is made to converge when the values of α, β, and γ have fallen in the range between −45° and +45° (limitation is set since the above method provides a plurality of convergent solutions). By this calculation method, the x-axis rotation angle, y-axis rotation angle, and z-axis rotation angle are drawn.

The specified camera directions are the directions with respect to the white line. Thus, how much the position of the white line is rotated in the perpendicular direction with respect to the ground surface from the installation position of each camera with respect to the target vehicle is calculated. Then, if how much the camera position is far away from the boundary between the target vehicle 1 and ground surface as viewed from just above the vehicle has been known, the boundary between the display position of the target vehicle image and display position of the image of surrounding area is determined according to the known distance. If not known, as illustrated in FIGS. 17A to 17D, at least one boundary position at which the white line disappears in the shade of the target vehicle 1 is detected in each of the cameras 1 to 14, and the detected boundary position is determined as the boundary between the display position of the target vehicle image and display position of the image of surrounding area.

Figure 18:
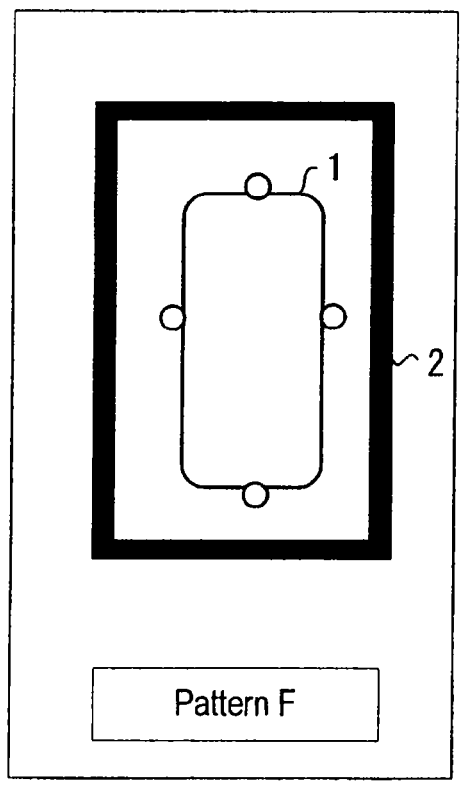
FIG. 18 is a view illustrating a white line frame in pattern F.

Further, if the vehicle 1 is so small in size that the angle of the white line 2 can be detected from the white line extending inside the four corners of the rectangular white line frame 2 in a state where the installation position of each camera has been specified, only a rectangular white frame as illustrated in a pattern F of FIG. 18 can be used.

That is, the reason that the white line extending outside from the rectangular white line frame 2 is required as in the case of FIGS. 4A to 4C and FIGS. 15A and 15B, is to increase the accuracy of the angle. Thus, the angle can be calculated using the white line extending inside the four corners of the rectangular white line frame 2, so that if the vehicle 1 is smaller in size to some extent than the white line 2, the accuracy requirement is satisfied.

Figure 19:
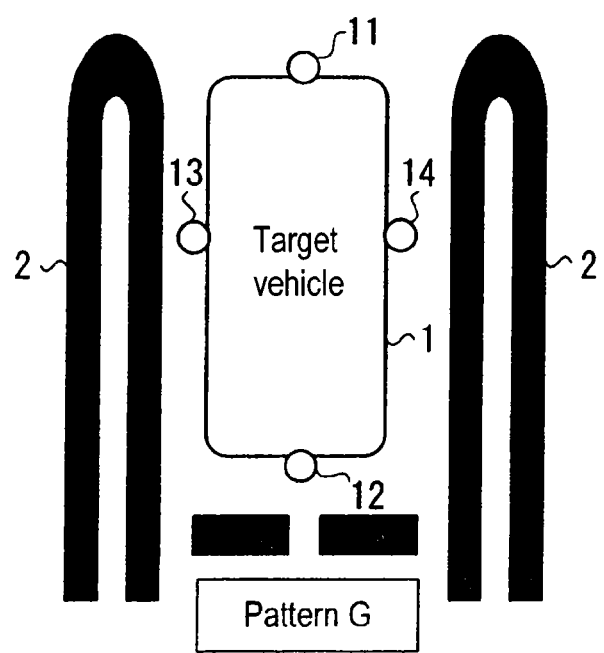
FIG. 19 is a view illustrating a white line frame in pattern G.

Further, recently, there is a case where a parking space is not represented by a rectangular frame, but defined by double lines, as illustrated in FIG. 19. In such a case (pattern G), if the installation positions of the cameras have been specified, the target vehicle 1 is set at the position illustrated in FIG. 19 for adjustment. Then, the feature points are detected as illustrated in FIGS. 20A to 20D.

Figure 20:
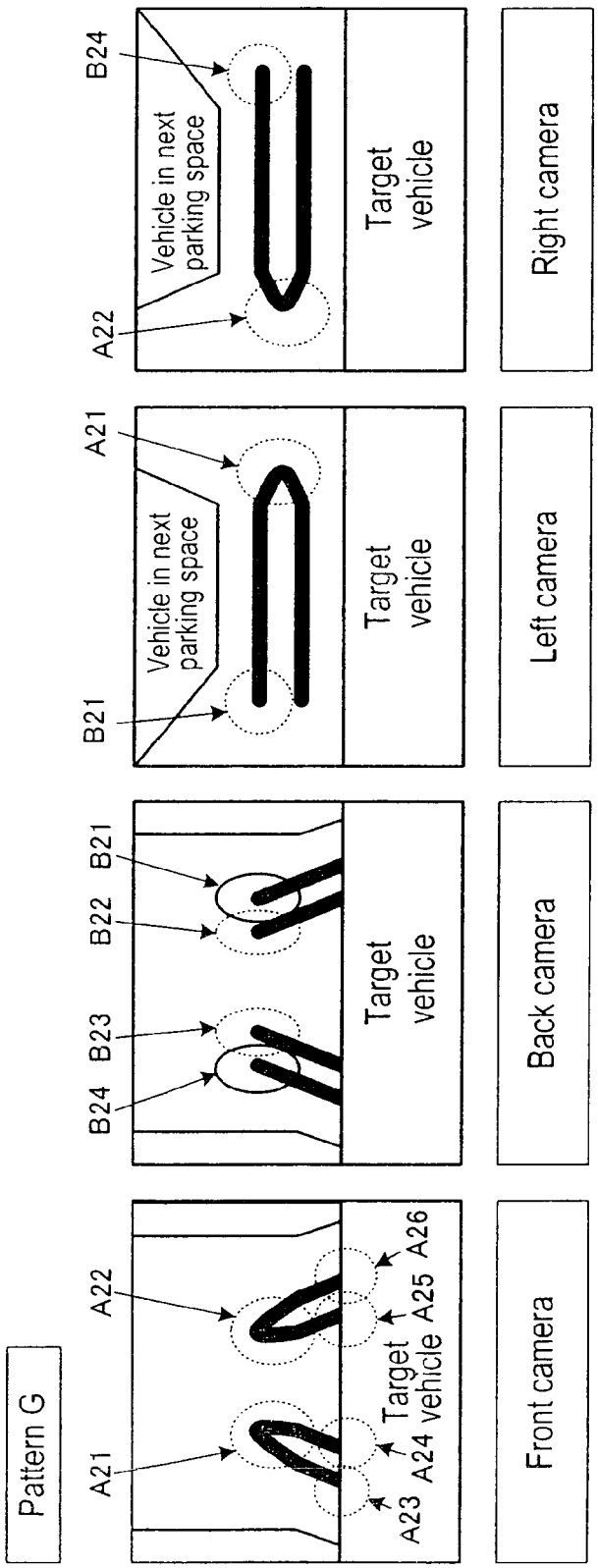
FIGS. 20A to 20D are views illustrating images photographed by the cameras in pattern G.

As illustrated in FIG. 20B, the feature points and two directions crossing each other at each of the feature points can be detected only in the image of the back camera 12. In the image of the front camera 11, feature points A21 and A22 each include a curved line, so that the angle cannot be detected correctly. Since feature points B21 to B24 in the back camera 12 exist on the same line, the two directions can be specified from a line connecting the four feature points.

Alternatively, intersections (although four intersections exist, calculation can be made with only two intersections) between the tangential lines of the feature points A21 and A22 and lines of the feature points A23 to A26 in the front camera 11 may be set as virtual feature points to specify the two directions crossing the tangent lines of the feature points A21 and A22 and lines of feature points A23 to A26.

Thus, based on the two feature points B21 and B24 and two directions crossing each other at each of the feature points or two feature points B22 and B23 and two directions crossing each other at each of the feature points in the image of the back camera 12, the nonlinear simultaneous equation method (Newton's method), etc., is used to determine x-axis rotation angle and y-axis rotation angle such that the angles of the two direction at each of the two feature points become a right angle. Then, z-axis rotation angle is determined such that the two feature points are positioned just lateral (however, left and right are reversed) to each other.

Then, the nonlinear simultaneous equation method (Newton's method), etc., is used to determine x-axis rotation angle, y-axis rotation angle, z-axis rotation angle of the front camera 11 (in consideration of the heights of the front and back cameras) such that the horizontal coordinates (x-coordinates) of the four feature points B21 to B24 in the position-corrected back camera 12 and feature points A23 to A26 on the four lines (although the feature points A23 to A26 are positioned on the boundary with the target vehicle in the drawing, they need not be on the boundary but only need to be arranged on the same line) in the front camera 11 are the same. Alternatively, the x-axis rotation angle, y-axis rotation angle, z-axis rotation angle of the front camera 11 may be determined from the virtual feature points and two directions crossing each other at each of the virtual feature points.

In order to increase accuracy, one of the functions of α, β, and γ may be represented by a calculation formula in which the vertical positions (y-axis positions) of the two feature points A21 and A23 (i.e., positions at which two curved portion contact a line) in the front camera 11 each at which the line is curved are the same. Alternatively, one of the functions of α, β, and γ may be represented by a calculation formula in which the horizontal positions (x-axis positions) of the two feature points A21 and A22 in the front camera 11 are the same as those of the middle points (middle point between B21 and B22 and middle point between B23 and B24) between the left side two feature points and between the right side two feature points of the back camera 12.

After the directions and positions of the front and back cameras 11 and 12 have thus been specified, the positions of the feature points A23 and B21 at the ends of the white line on the left side of the vehicle 1 in the front and back cameras 11 and 12 are calculated on the basis of the position of the left camera 13. The angles of the x-axis rotation, y-axis rotation, and z-axis rotation are calculated such that the coordinates obtained by x-axis rotating, y-axis rotating, and z-axis rotating the detection results of the feature points in the left camera 13 based on the position of the left camera 13 coincide with the position as viewed from the left camera 13. The calculation method used here is the same as the method obtained by replacing the front and back cameras 11 and 12 described in the pattern D with the left and right cameras 13 and 14. Then, calculation is made for the right side in the same manner. Any one side of the double line may be used as the feature point on the back side of the vehicle.

Alternatively, x-axis rotation angle and y-axis rotation angle are determined with the feature points B21 and B22 in the left camera 13 used as the two feature points and two directions at each of the feature points set as the direction of the white line direction and direction of another feature point (B22 in the case where B21 is set as the feature point or B21 in the case where b22 is set as the feature point), and then z-axis rotation angle may be determined such that the white line becomes completely vertical. Similarly, in the case of the right camera 14, the feature points B23 and B24 and two directions crossing each other at each of the feature pints are detected so as to determine x-axis rotation angle, y-axis rotation angle, and z-axis rotation angle.

The specified camera directions are the directions with respect to the white line. Thus, how much the position of the white line is rotated in the perpendicular direction with respect to the ground surface from the installation position of each camera with respect to the target vehicle is calculated. Then, if how much the camera position is far away from the boundary between the target vehicle 1 and ground surface as viewed from just above the vehicle has been known, the boundary between the display position of the target vehicle image and display position of the image of surrounding area is determined according to the known distance. If not known, at least one boundary position (average of a plurality of boundary positions or most reliable one of the plurality of boundary positions may be used) at which the white line disappears in the shade of the target vehicle 1 is detected in each of the cameras, and the detected boundary position is determined as the boundary between the display position of the target vehicle image and display position of the image of surrounding area. In the case of the left and right cameras 13 and 14, the boundary between the tire of the vehicle 1 and ground surface or position at which a wheel stop disappears in the shade of the vehicle is determined as the boundary line.

Further, in the case of the pattern G, the vehicle 1 may be positioned sideways with respect to the white line for detection of the two feature points and angles (two directions) thereof. If information such as the length or aspect ratio of the white line has been known, the information may be fed into the calculation formula for reduction of calculation amount.

Figure 21:
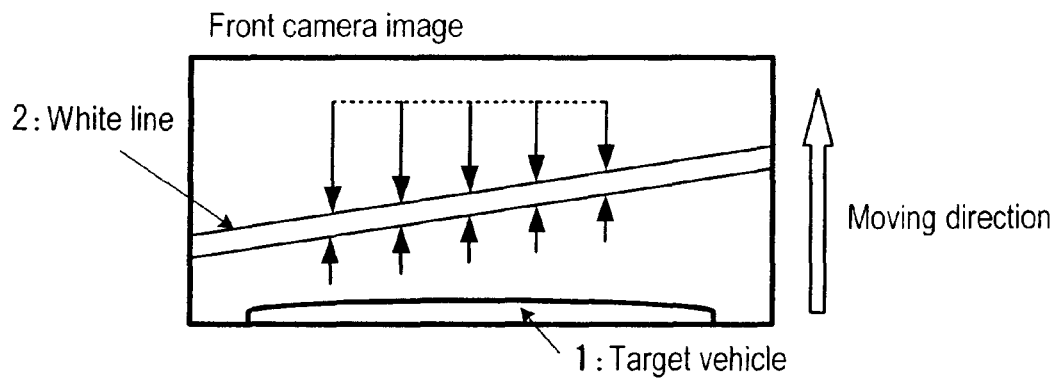
FIG. 21 is a view illustrating a case where the absolute position is adjusted across the line (white line)

Further, the absolute position may be adjusted across the line (white line 2), as illustrated in FIG. 21. In this case, disappearing and appearing points are detected across the white line 2. In order to detect the boundary across the white line 2, it is preferable to detect it in the lateral direction with respect to the moving direction of the vehicle 1. At this time, the vehicle 1 is preferable to move in a linear manner with a rudder angle as small as possible. A boundary detection method in the front camera 11 performed under the above assumption will be first described below.

First, as illustrated in FIG. 21, the white line 2 is detected, and the width of the white line 2 in the direction supposed to be the moving direction is measured. The width of the white line 2 is measured at a plurality of points arranged with predetermined intervals in the perpendicular direction with respect to the moving direction. If the moving direction is not rotated, the acquired widths of the white line 2 in the moving direction are not changed. Thus, the position at which the widths of the white line 2 starts changing due to further movement of the vehicle in the front direction is defined as the boundary of the vehicle 1.

Figure 22A:
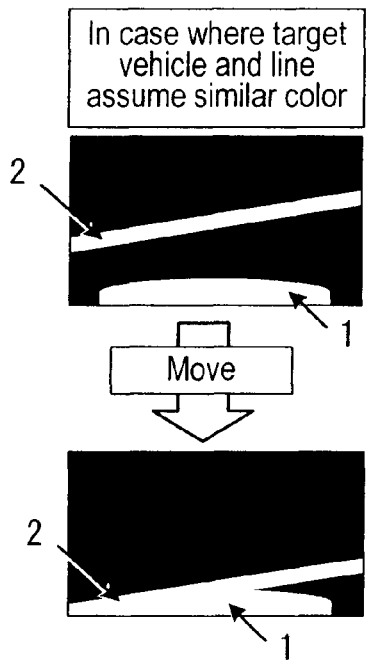
FIGS. 22A and 22B are views illustrating a case where the vehicle and white line or vehicle and ground surface assume a similar color.
Figure 22B:
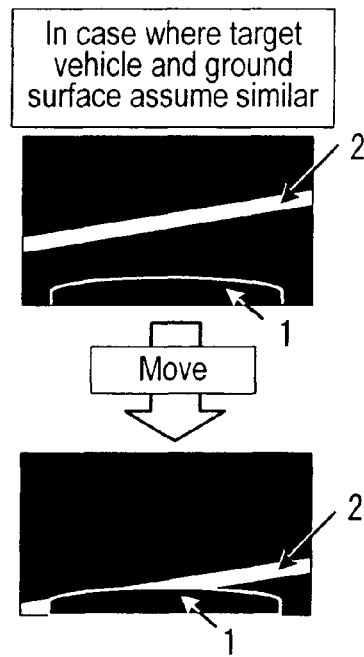

If the vehicle 1 and white line 2 assume a similar color, the width of the white line 2 is increased as illustrated in FIG. 22A, while if the vehicle 1 and ground surface assume a similar color, the width of the white line 2 is reduced as illustrated in FIG. 22B. Then, the boundary points are calculated using a least-square method to thereby determine the entire boundary. Further, the boundary in the image of the back camera 12 can be determined in the same manner.

Figure 23A:
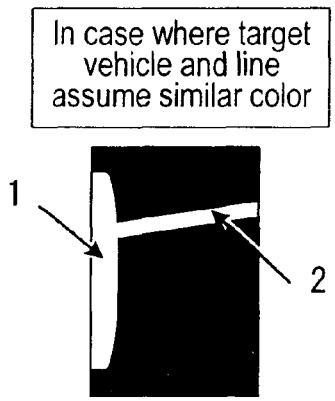
FIGS. 23A to 23C are views illustrating detection of the boundary between the target vehicle and white line.
Figure 23B:
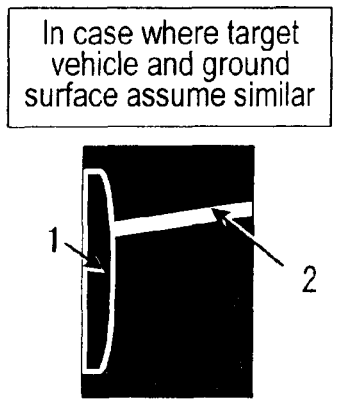
Figure 23C:
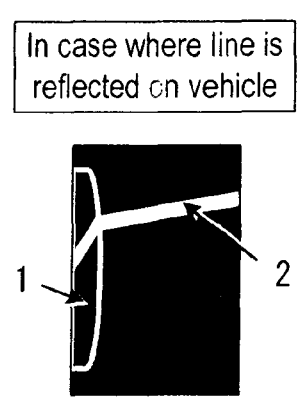

The boundary detection method in the image of the right camera 14 will next be described. As illustrated in FIGS. 23A to 23C, the white line 2 is detected, the direction of the detected line is then measured, and the width of the detected line in the measured direction is measured. Then, the position at which the direction and width of the white line 2 cannot be maintained is determined as the boundary. FIG. 23A illustrates a case where the vehicle 1 and white line 2 assume a similar color, and FIG. 23B illustrates a case where the vehicle 1 and ground surface assume a similar color.

The above processing is performed at a plurality of times while the target vehicle 1 is moved, and the boundary points are calculated using a least-square method to thereby determine the entire boundary. Further, as illustrated in FIG. 23C, in order to prevent misrecognition of reflection of the white line 2 on the vehicle 1 as a line whose direction and width are not changed, a case where a given recognized boundary point is clearly displaced from other boundary points is excluded. The boundary in the image of the left camera 13 can be determined in the same manner. Thus, the boundary position in each of the camera images can be specified.

Then, in order to make the direction of the target vehicle 1 perpendicular to the display image, the average of the boundaries calculated from the images of the left and right cameras 13 and 14 is determined as the inclination of the target vehicle 1. In a state where the inclination is corrected, the vertical width of the target vehicle 1 is drawn from the boundaries in the images of the front and back cameras 11 and 12. Further, the lateral width of the target vehicle 1 is drawn from the boundaries in the images of the left and right cameras 11 and 12. Then, the center position of the target vehicle 1 is specified from the vertical and lateral widths. Based on the above results and values set in FIG. 11, the position, direction and magnitude of the target vehicle 1 can be easily adjusted.

The absolute position may be adjusted depending on the camera positions obtained in the relative position adjustment. That is, when the left and right cameras 13 and 14 are installed at the same positions in terms of the vertical direction of the vehicle 1, adjustment is made such that the installation positions are positioned just lateral to each other, and the positions of the respective cameras 13 and 14 are set as the boundary lines.

The following various modifications may be possible.

(1) The vehicle 1 may be moved sideways with respect to the frame 2 of the parking space for calibration. If so, the lateral line is separated from the vehicle, so that the calculation of the angles can be made by the line extending inside the four corners of the rectangular line frame 2 without requiring the line extending outside the rectangular frame.

(2) Front tires (or back tires) captured by the left and right cameras may be detected, and the direction of the target vehicle may be determined such that the positions of the left and right tires are horizontal with respect to the display images. It is preferable that the camera images be previously made perpendicularly to the ground surface for detection of the positions of the tires. As a result, it becomes possible to respond to a vehicle having a complicated shape.

(3) For easy detection of the disappearing point of the white line, a non-reflective sheet may previously be attached to the target vehicle. Even if the white line is reflected on the target vehicle, the disappearing point of the white line can be detected correctly.

(4) In the case where the disappearing position of the white line coincides with the edge of the viewing field of the camera, the position of the vehicle with respect to the camera cannot be detected. In this case, if the shape of the vehicle has been known, the image may be displayed with reference to the disappearing position of the white line with respect to the vehicle captured by the front or back camera. Further, in the case where the disappearing position of the white line with respect to the vehicle coincides with the edge of the viewing field of both the front and back cameras, the image may be displayed with reference to the positions of the tires captured by the left and right cameras. As a result, it becomes possible to respond to a case where the vehicle is not captured by the front and back cameras.

(5) Although a case where the four cameras 11 to 14 are used has been described, the number of cameras to be used may be increased or reduced.

(6) In the case where the absolute distance needs to be correctly set, such as a case where the position of the target vehicle image is specified in the top view image, one of values, such as the distance between the front and back tires, vehicle width, distance of the white line, and the like may previously be set for subsequent calculation. Further, an acceleration sensor or a vehicle speed pulse may be used to measure the vehicle speed, and the distance may be correctly determined from a linear travel distance. As a result, the distance can be set correctly.

(7) In order to increase the adjustment accuracy, more images may be acquired.

(8) The disappearing position of the white line may be measured, not roughly, but in a continuous manner along the entire periphery of the vehicle to determine the shape of the vehicle for display of surrounding area of the vehicle. The image of the surrounding area of the vehicle can be displayed depending on the shape of the vehicle.

(9) In the case where the tires go over the white line in the images of the left and right cameras, the lateral width of the target vehicle becomes maximum. In this case, two points defining the maximum lateral width may be regarded as the positions of the tires for determination of the direction of the target vehicle.

(10) Fine adjustment may be manually performed in the last stage. As a result, it is possible to correct a fine displacement and to meet user's preferences.

(11) Parameters such as rudder angle of the vehicle, acceleration sensor, and gyro may be used. This reduces the adjustment time and increases accuracy.

(12) An auxiliary line may be added to the feature point for easy adjustment. This makes it easy to recognize the parking frame. Further, the calculation time can be reduced. The auxiliary line may have any form and may be prepared as a sheet or painted on the ground surface.

(13) A plurality of feature points may be acquired for reduction of calculation error, and a least-square method may be used for calculation so that problems do not arise even if the concaved portions or faded portions exist in the white line.

(14) In the case where the corners of the white line frame are not right angles, i.e., in the case where the white line frame is not a rectangle, if the angles have been known, the known angles are used to perform calculation. As a result, it is possible to respond to a case where the white line frame is, e.g., a parallelogram.

(15) A configuration in which setting (ON/OFF, degree, etc.) of the calibration can be made by a user may be adopted for meeting user's preferences.

According to the present embodiment, the white line of the parking space is used to perform the calibration, so that a specified calibration pattern is not required. Further, by the use of information including the two feature points and two directions crossing each other at each of the feature points, it is only necessary to detect at least two feature points, eliminating the need to move the vehicle far away from the parking frame, thereby reducing the movement amount of the vehicle. Further, even if another vehicle (vehicles) exists next to the target vehicle, there arises no problem. Further, the disappearing point and appearing point of the line obtained when the vehicle goes over the line painted on the ground are used to determine the boundary and, based on the determined boundary, the size and direction of the target vehicle can automatically be specified.

While certain embodiments have been described, these embodiments have been presented by way of example only, and are not intended to limit the scope of the inventions. Indeed, the novel methods and systems described herein may be embodied in a variety of the other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A camera calibration apparatus comprising: circuitry configured to act as: an image photographing unit that has a plurality of cameras mounted on a vehicle to obtain camera images for the surrounding area of the vehicle; a feature point detection unit that identifies an image of lines representing a parking frame from each of images obtained by the plurality of cameras and detects at least two feature points on the parking frame from each of the camera images; a viewpoint conversion unit that synthesizes the camera images based on information including the at least two feature points detected by the feature point detection unit and two directions crossing vertical to each other at each of the at least two feature points to generate an overhead view having a viewpoint from above the vehicle; an adjustment unit that determines the boundary position between the vehicle and line image from the overhead view to determine the display frame of a vehicle image and changes the overhead view such that the size ratio and position of the display frame with respect to the overhead image become previously specified values, the adjustment unit performing the determining and the changing without requiring vehicle movement; wherein the adjustment unit sets the boundary lines based on the boundary position between each of the four sides of the vehicle and line image and determines a region defined by the minimum and maximum values of the coordinates of the intersections of the boundary lines as the display frame of the vehicle image; wherein the adjustment unit determines the position at which the line image disappears in the shade of the vehicle due to movement of the vehicle or position at which the line appears from the shade of the vehicle as the boundary position; and a camera data storage that stores camera parameters representing characteristics of each of the cameras which are calculated based on the changed overhead view.

2. The apparatus according to claim 1, wherein
the image photographing unit has four cameras for photographing the front surrounding area, back surrounding area, left surrounding area, and right surrounding area of the vehicle.

3. The apparatus according to claim 1, wherein
the image photographing unit photographs the parking frame being defined by white lines at a plurality of different positions by moving the vehicle, and
the feature point detection unit detects the at least two feature points at the respective different positions.

4. The apparatus according to claim 1, wherein
the image photographing unit photographs the parking frame being defined by white lines, from at least one different position after moving the vehicle, and
the feature point detection unit detects the at least two feature points at which the white lines cross each other and two directions of the white lines crossing each other at each of the at least two feature points.

5. The apparatus according to claim 1, wherein
the adjustment unit determines the boundary position based on a change in the width of the line image when the vehicle passes over the line image.

6. The apparatus according to claim 1, wherein the feature point detection unit detects the at least two feature points without detecting the entire parking frame.

7. The apparatus according to claim 1, wherein a boundary line corresponding to one of the two directions intersects a boundary line corresponding to the other of the two directions at an intersection point corresponds to at least one of the least two feature points.

8. The apparatus according to claim 1, wherein the intersection point forms a right angle.

9. The apparatus according to claim 1, wherein the at least two feature points correspond to only two portions of the parking frame, each of the only two portions being smaller than each line outlining the parking frame.

* * * * *